(12) United States Patent
Ziolek et al.

(10) Patent No.: US 11,851,027 B2
(45) Date of Patent: Dec. 26, 2023

(54) CARGO STORAGE ASSEMBLY

(71) Applicants: Hyundai Motor Company, Seoul (KR); Kia Corporation, Seoul (KR)

(72) Inventors: Scott Ziolek, Ann Arbor, MI (US); Jason Lilburn, Taylor, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 124 days.

(21) Appl. No.: 17/483,283

(22) Filed: Sep. 23, 2021

(65) Prior Publication Data

US 2023/0089761 A1    Mar. 23, 2023

(51) Int. Cl.
*B60R 5/04* (2006.01)
*B60R 7/02* (2006.01)
*B60R 13/01* (2006.01)

(52) U.S. Cl.
CPC ............. *B60R 5/045* (2013.01); *B60R 7/02* (2013.01); *B60R 13/013* (2013.01)

(58) Field of Classification Search
CPC .. B60R 5/045; B60R 5/048; B60R 7/02; B60R 2011/0036; B60R 13/013; B60R 2013/018; B60R 2013/0293; B60R 13/0275; B60R 13/0268
USPC ...................................................... 296/37.16
See application file for complete search history.

(56) References Cited

U.S. PATENT DOCUMENTS

| | | | |
|---|---|---|---|
| 6,811,196 B2 | 11/2004 | Gammon | |
| 8,172,295 B2 * | 5/2012 | Fischer | B60R 5/04 |
| | | | 296/37.16 |
| 8,534,737 B2 * | 9/2013 | Torres | B60R 5/044 |
| | | | 296/37.16 |
| 9,073,488 B1 * | 7/2015 | Stanczak | B60N 2/36 |
| 9,096,178 B1 * | 8/2015 | Stanczak | B60R 5/045 |
| 9,260,060 B2 * | 2/2016 | Matsubara | B60R 5/044 |
| 9,278,647 B2 * | 3/2016 | Stanczak | B60N 2/206 |
| 10,081,304 B2 | 9/2018 | Keimig | |
| 10,647,268 B2 * | 5/2020 | Kato | B60R 5/045 |
| 11,420,565 B2 * | 8/2022 | Ritter | B60R 13/013 |

FOREIGN PATENT DOCUMENTS

| | | | | |
|---|---|---|---|---|
| DE | 102014011565 A1 | * | 2/2016 | ............. B60R 5/045 |
| EP | 2 100 776 A1 | | 9/2009 | |
| EP | 2184206 A1 | * | 5/2010 | ............... B60R 5/04 |
| EP | 2 578 453 B1 | | 1/2018 | |
| EP | 3 450 256 B1 | | 3/2020 | |
| JP | 2003-165387 A | | 6/2003 | |
| JP | 2008-247167 A | | 10/2008 | |

\* cited by examiner

*Primary Examiner* — Jason S Morrow
(74) *Attorney, Agent, or Firm* — Fox Rothschild LLP

(57) ABSTRACT

Methods, apparatuses, and systems are described for a cargo storage assembly. The system includes a first panel, a second panel, an overlap, and a hinge. The hinge is configured to rotate the second panel to a vertical orientation with respect to the first panel to expose an underfloor compartment. The first panel has a groove proximate to the second panel that extends along a top surface of the first panel. The second panel has a protrusion proximate to the first panel that extends along a bottom surface of the second panel. The protrusion of the second panel corresponds in size to the groove of the first panel. The overlap is formed between the groove and the protrusion with the first panel and the second panel in a horizontal configuration.

18 Claims, 20 Drawing Sheets

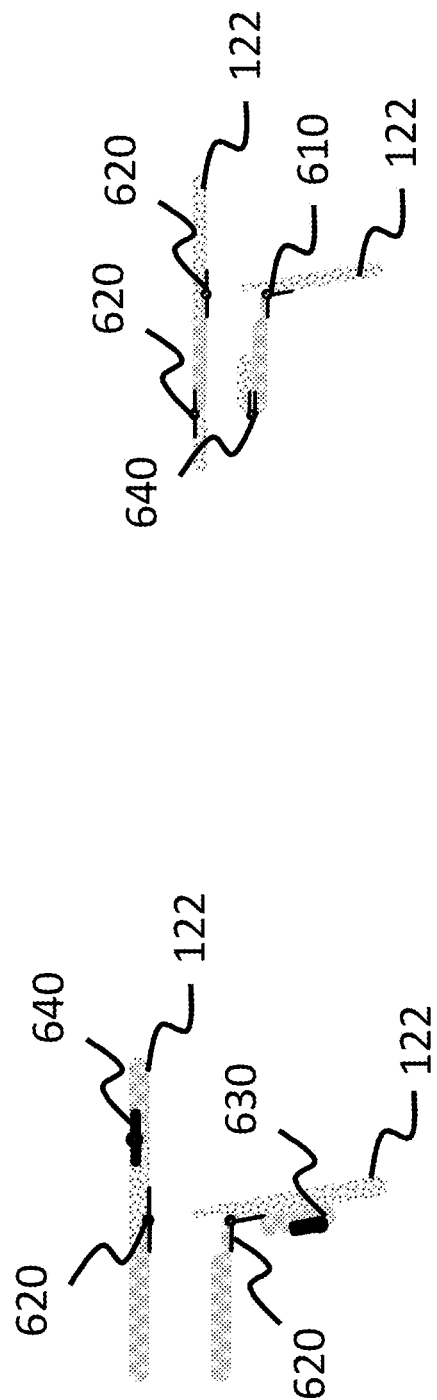

CARGO STORAGE ASSEMBLY

TECHNICAL FIELD

The present disclosure relates generally to storage, and more particularly, to cargo storage assembly for vehicles.

BACKGROUND

Vehicles transport different types of cargo. For example, a vehicle may transport groceries, large and long boxes, wet or dirty items, suitcases, and several smaller items. A vehicle typically includes a trunk in which items may be stored. However, the trunk may not be suitable for carrying these items. For example, some objects may roll around when driving or fall out when the trunk is opened increasing risk of damage. Additionally, a window at the trunk may also make some items visible from the outside thus increasing the risk of potential theft. Currently, trunks are unable to be reconfigured to adapt to the different types of cargo to also ensure safety of or secure the items within the trunk.

SUMMARY

The present disclosure provides methods, systems, devices, and articles of manufacture for cargo storage assembly.

In one aspect, there is provided a system including a first panel, a second panel, an overlap, and a hinge. The first panel has a groove proximate to the second panel that extends along a top surface of the first panel. The second panel has a protrusion proximate to the first panel that extends along a bottom surface of the second panel. The protrusion of the second panel corresponds in size to the groove of the first panel. The overlap is formed between the groove and the protrusion with the first panel and the second panel in a horizontal configuration. The hinge is coupled to the groove of the first panel and coupled to the bottom surface of the second panel. The hinge is configured to rotate the second panel to a vertical orientation with respect to the first panel to expose an underfloor compartment.

In some variations, the system may further comprise a notch in the underfloor compartment for securing the second panel in the vertical orientation. The underfloor compartment is configured to be exposed by rotating the hinge such that the second panel is approximately perpendicular to the first panel and inserting the second panel into the notch. Additionally, the hinge is configured to separate the groove of the first panel from the protrusion at the second panel by rotating the hinge. In some variations, the system further comprises a side bracket in the underfloor compartment, the side bracket configured to maintain the second panel in the vertical orientation, and wherein the second panel is guided beyond the side bracket to the vertical orientation with respect to the first panel to expose the underfloor compartment. In some variations, the system further comprises a retaining wall between the first panel and the underfloor compartment, the retaining wall formed by the protrusion of the second panel upon inserting the second panel into the notch.

Further, the system may further comprise a cargo load floor wherein the overlap of the groove of the first panel and the protrusion of the second panel is maintained while pivoting the first panel and the second panel at an angle with respect to the cargo load floor to expose the underfloor compartment. In some variations, the system may further comprise a cargo load floor formed by the first panel and the second panel in the horizontal configuration, the cargo load floor formed by the first panel and the second panel in the horizontal configuration enclosing the underfloor compartment. The groove extends along a lower edge of the first panel, the lower edge being proximate to the second panel. Additionally, the hinge is coupled at the lower edge of the first panel and the hinge is coupled to a base of the protrusion on the bottom surface of the second panel. Further, the first panel and the second panel are disposed between a vehicle seat and a rear vehicle door and wherein the hinge is at least one of a piano hinge type, a U-channel hinge type, a living hinge type, and an interlaced finger type.

In another aspect, a method for modifying a storage configuration in a vehicle is described. The method comprises rotating a hinge coupled to a first panel and a second panel, the hinge coupled at a groove of the first panel and coupled to a bottom surface of the second panel, the hinge configured to rotate the second panel to a vertical orientation with respect to the first panel to expose an underfloor compartment. The method further comprises inserting the second panel into a notch in the underfloor compartment, the notch for securing the second panel in the vertical orientation. Further, the groove extends along a top surface of the first panel and proximate to the second panel. Further, the second panel has a protrusion proximate to the first panel that extends along the bottom surface of the second panel, the protrusion corresponding in size to the groove of the first panel and configured to overlap the groove of the first panel. In some variations, rotating the hinge separates the groove of the first panel from the protrusion at the second panel. The method may further comprise guiding the second panel beyond a side bracket located in the underfloor compartment to the vertical orientation with respect to the first panel, the side bracket for maintaining the second panel in the vertical orientation. Additionally, inserting the second panel into the notch causes the protrusion of the second panel to create a retaining wall between the first panel and the underfloor compartment. The method may further comprise maintaining an overlap of the groove of the first panel and the protrusion of the second panel while pivoting the first panel and the second panel at an angle with respect to a cargo load floor.

Further, the first panel and the second panel in a horizontal configuration form a cargo load floor of the vehicle, and wherein the first panel and the second panel enclose the underfloor compartment in the horizontal configuration. In some variations, the groove extends along a lower edge of the first panel, the lower edge being proximate to the second panel. Additionally, the hinge is coupled at the lower edge of the first panel and the hinge is coupled to a base of the protrusion on the bottom surface of the second panel. Further, the first panel and the second panel are disposed between a vehicle seat and a rear vehicle door. In some variations, the hinge is at least one of a piano hinge type, a U-channel hinge type, a living hinge type, and an interlaced finger type.

In yet another aspect, a system for modifying a storage configuration in a vehicle is described. The system comprises a first panel and a second panel, the first panel having a groove proximate to the second panel that extends along a top surface of the first panel, the second panel having a protrusion proximate to the first panel that extends along a bottom surface of the second panel, the protrusion of the second panel corresponding in size to the groove of the first panel. The system includes an overlap formed between the groove and the protrusion with the first panel and the second panel in a horizontal configuration. The system includes a hinge coupled to the groove of the first panel and coupled to the bottom surface of the second panel, the hinge configured to rotate the second panel to form a covered cargo area.

In some variations, the system further comprises a bracket for supporting the second panel in an elevated configuration, wherein the second panel is configured to elevate relative to the first panel, and wherein the second panel is configured to rotate about the hinge in the elevated configuration to be supported by the bracket to form the covered cargo area. In some variations, the overlap of the first panel and the second panel is maintained while pivoting the first panel and the second panel at an angle past the bracket to form the covered cargo area. Additionally, the system may include a side trim panel configured to house and deploy the bracket to maintain the second panel in the elevated configuration, and wherein the bracket is configured to be deployed to form the covered cargo area.

In some variations, the second panel is configured to rotate down to separate the groove of the first panel from the protrusion at the second panel. Further, the first panel and the second panel in the horizontal configuration form a cargo load floor of the vehicle. Further, the groove extends along a lower edge of the first panel, the lower edge being proximate to the second panel. Further, the hinge is coupled at the lower edge of the first panel and the hinge is coupled to a base of the protrusion on the bottom surface of the second panel. Further, the first panel and the second panel are disposed between a vehicle seat and a rear vehicle door and wherein the hinge is at least one of a piano hinge type, a U-channel hinge type, a living hinge type, and an interlaced finger type In yet another aspect, a method for modifying a storage configuration in a vehicle is described. The method comprises elevating a second panel relative to a first panel, the first panel having a groove extending along a top surface of the first panel and proximate to the second panel, the second panel having a protrusion proximate to the first panel that extends along a bottom surface of the second panel. Further, the method further comprises rotating a hinge coupled to the groove of the first panel and coupled to the bottom surface of the second panel, the hinge configured to rotate the second panel to form a covered cargo area. Further, the protrusion of the second panel corresponds in size to the groove of the first panel, the protrusion being configured to overlap the groove of the first panel.

In some variations, the covered cargo area includes a bracket for supporting the second panel in an elevated configuration, the covered cargo area configured to be created by rotating the hinge such that the second panel is supported with the bracket in the elevated configuration. The covered cargo area is further configured to be created by maintaining an overlap of the groove of the first panel and the protrusion of the second panel while pivoting the first panel and the second panel at an angle past the bracket. Further, the bracket is deployable for maintaining the second panel in the elevated configuration, and wherein the covered cargo area is further configured to be created by deploying the bracket located at a side trim panel.

Further, the covered cargo area is further configured to be created by rotating the second panel down such that the bottom surface of the second panel rests on the bracket. In some variations, the rotating the second panel down separates the groove of the first panel from the protrusion at the second panel. Additionally, the first panel and the second panel in a horizontal configuration form a cargo load floor of the vehicle. Further, the groove extends along a lower edge of the first panel, the lower edge being proximate to the second panel. Additionally, the hinge is coupled at the lower edge of the first panel and the hinge is coupled to a base of the protrusion on the bottom surface of the second panel. Further, the first panel and the second panel are disposed between a vehicle seat and a rear vehicle door and wherein the hinge is at least one of a piano hinge type, a U-channel hinge type, a living hinge type, and an interlaced finger type The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7A depicts an example of a side view of a diagram of multiple panels with different hinge types.

FIG. 7B depicts an example of a side view of another diagram of multiple panels with different hinge types.

DETAILED DESCRIPTION

Figure 1:
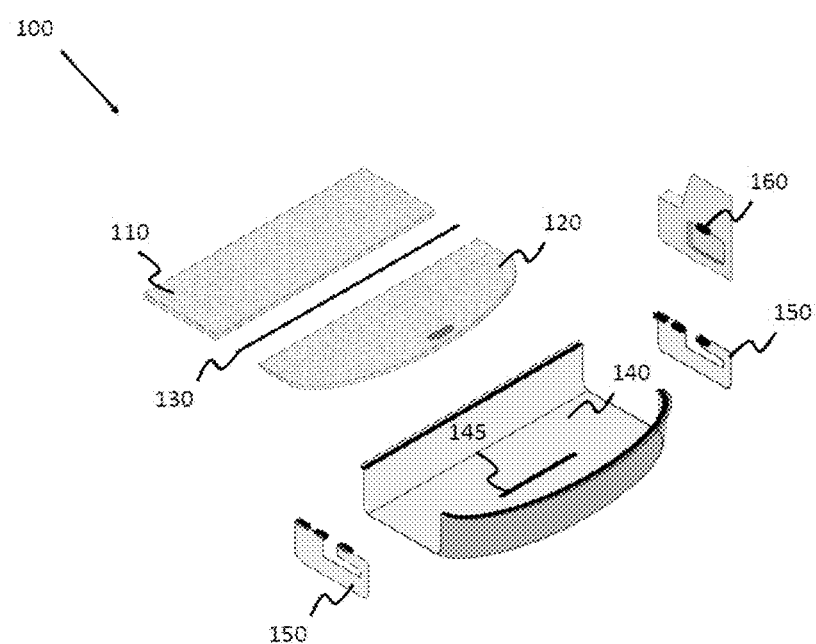
FIG. 1 depicts an example of an exploded view of a diagram representative of a cargo storage assembly configured to expose an underfloor compartment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

According to the present disclosure, a cargo storage assembly is configured to modify its storage structure. The cargo storage assembly may transport different types of cargo. For example, the cargo storage assembly may be configured to load large and long boxes or it may be configured to store several smaller items. The cargo storage assembly may be located at the truck at the rear of a vehicle. The cargo storage assembly solves the problem of objects rolling around the trunk while the vehicle is driving. Additionally, the cargo storage assembly may maximize the space in the trunk by adjusting its structure to different configurations. For example, the cargo storage assembly may include an underfloor compartment in which smaller items may be stored.

The underfloor compartment of the cargo storage assembly may prevent items from falling out of the trunk when the trunk door is opened and may keep items separated from the remaining portions of the trunk. The underfloor compartment may located under the main cargo floor. In some embodiments, the underfloor compartment may be located under the more rearward portion of the cargo storage assembly. The underfloor compartment may be used to conceal items underneath the main vehicle floor.

A retaining wall may extend between the main floor of the vehicle and the underfloor compartment in response to configuring the cargo storage assembly to expose the underfloor compartment. This retaining wall may prevent objects from falling into the underfloor compartment while providing additional support to taller items that are located in the underfloor compartment to prevent tipping. The retaining wall may also create separation between the main floor of the vehicle and the underfloor compartment.

The cargo storage assembly may have a cargo cover structure and may elevate the cargo storage assembly to a higher position within the trunk. This elevated position may obstruct the view into the vehicle from the outside. For example, the cargo storage assembly may be elevated near the window to block persons from viewing the items in the trunk thus deceasing the risk of potential theft.

The methods, systems, and apparatuses described herein are for a cargo storage assembly. The various embodiments may modify the storage configuration of a vehicle. The various embodiments may also form a cargo cover structure for obstructing the view into the trunk.

FIG. 1 depicts an exploded view of a diagram representative of a cargo storage assembly configured to expose an underfloor compartment 140. The exploded view depicts the back portion of the vehicle or the trunk. The components or elements of the cargo storage assembly may include a first panel 110 and a second panel 120 coupled together with a hinge 130. The hinge 130 may be at the midpoint of the first panel 110 and the second panel 120. The cargo storage assembly may be configured to place the second panel 120 in a vertical position. Configuring the second panel 120 in a vertical position may divide the area in the trunk into different sections to separate cargo loads and to prevent items from rolling around in the trunk. The cargo storage assembly includes an underfloor compartment 140. The underfloor compartment 140 may include a front wall, a rear wall, sidewalls 150, and bracket supports at the side walls. The front wall, the rear wall, and the sidewalls 150 form the contours of the underfloor compartment 140. The floor of the underfloor compartment 140 may include a notch 145. The notch 145 may secure the second panel 120 to the floor of the underfloor compartment 140 to prevent the panel from sliding across the floor of the underfloor compartment 140.

The first panel 110 and the second panel 120 may form the main vehicle floor when the two panels are in a horizontal position. The first panel 110 and the second panel 120 may be coupled with a hinge 130. The hinge 130 may be located at a midpoint of the first panel 110 and the second panel 120. The second panel 120 may be further rearward than the first panel 110. The first panel 110 may be closer to the front of the vehicle than the second panel 120. The second panel 120 may have a curved shape to conform to the rearward portion of the trunk.

The underfloor compartment 140 may include a front wall and a rear wall. The front wall may be closer to the front of the vehicle than the rear wall. The top side of the front wall may include a recess for supporting the first panel 110. The rear wall may be closer to the rear of the vehicle than the front wall. The rear wall may be curved and may be parallel to the bumper of the vehicle. The top side of the rear wall may include a recess to support the second panel 120. The notch 145 of the front wall or the notch 145 of the rear wall may be recessed into the wall.

The underfloor compartment 140 may include two sidewalls 150. The two sidewalls 150 may include a bracket configured to support the secondary panel in a vertical position. The bracket may include securing supports between which the vertical panel may be inserted to prevent the vertical panel from sliding across the bottom of the underfloor compartment 140. Additionally, and/or alternatively, the bracket may include slots configured to hold the vertical panel in place to prevent the vertical panel from sliding across the bottom of the underfloor compartment 140.

Figure 2:
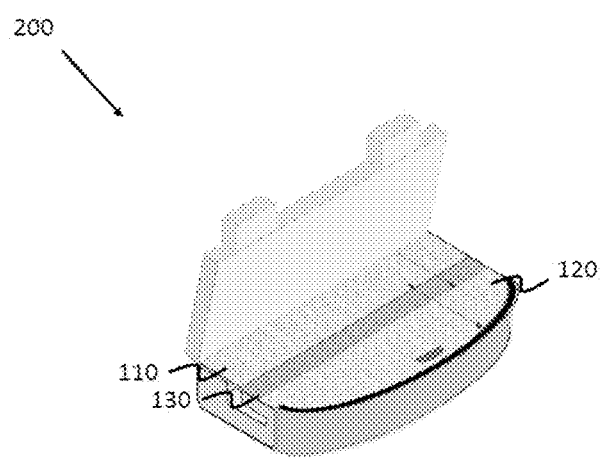
FIG. 2 depicts an example of an assembled view of a diagram representative of a cargo storage assembly configured to expose an underfloor compartment.

FIG. 2 depicts an example of an assembled view of a diagram representative of a cargo storage assembly configured to expose an underfloor compartment 140. The first panel 110 and the second panel 120 may be placed into different configurations by a hinge 130. The hinge 130 may be used to expose an underfloor compartment 140. Unlike other cargo storage assemblies, the first panel 110 and the second panel 120 may change configurations to avoid dead space between the first panel 110 and the second panel 120. The various storage configurations may be created by rotating the second panel 120 with respect to the first panel 110.

The cargo storage assembly may include a first panel 110 and a second panel 120. The first panel 110 and the second panel 120 may form a partial overlap. The partial overlap may be formed by portions of the first panel 110 and the second panel 120. A hinge 130 may be coupled to the first panel 110 and the second panel 120. The hinge 130 may be configured to rotate the second panel 120 to a vertical orientation with respect to the first panel 110 to expose an underfloor compartment 140. In some embodiments, the hinge 130 may be configured to rotate the first panel 110 to a vertical orientation with respect to the second panel 120 to expose an underfloor compartment 140. The overlapping portion of the first panel 110 and the second panel 120 may maximize the space in the trunk by increasing the likelihood that all portions of the trunk are utilized. That is, the overlapping portion of the panel may prevent dead space that cannot carry cargo in the back of the vehicle.

The first panel 110 and the second panel 120 may form a main cargo floor. The main cargo floor may be flat when the first panel 110 and the second panel 120 are in a horizontal configuration. The main cargo floor may cover an underfloor compartment 140. The main cargo floor may fold to expose the underfloor compartment 140 by pivoting a panel via a hinge 130. The hinge 130 may couple the first panel 110 and the second panel 120. The hinge 130 may be located at the midway point of the main cargo floor. Additionally, and/or alternatively, the hinge 130 may be located at the overlapping portion of the first panel 110 and the second panel 120. In particular, the hinge 130 may be at the edge of the overlapping portion. For example, the hinge 130 may be at the edge of the first panel 110. The first panel 110 and the second panel 120 may be configured to rotate with respect to each other at the edge of the first panel 110. The hinge 130 may be located where the edge of the first panel meets the base of a protrusion of the second panel 120.

The first panel 110 may include a groove. The groove may be proximate to the second panel 120. The groove may extend along a top surface of the first panel 110. The first panel 110 may include a top surface with a groove that constitutes the overlapping portion. The groove may extend approximately half the depth of the first panel 110. The groove may extend along a lower edge of the first panel 110. The lower edge may be proximate to the second panel 120. In some embodiments, the groove may be a cutout. The overlapping portion of the second panel 120 may be configured to fit in the cutout at the first panel 110.

Further, the second panel 120 may include a protrusion. The protrusion may be proximate to the first panel 110. The protrusion may extend along a bottom surface of the second panel 120. The second panel 120 may include a bottom surface with a protrusion that constitutes the overlapping portion of the bottom surface. The protrusion may extend approximately half the height or depth of the second panel 120. In some embodiments, the protrusion may be a cutout. The overlapping portion of the second panel 120 may be configured to fit in the cutout at the second panel 120. The protrusion of the second panel 120 may correspond in size to the groove of the first panel 110. Additionally, the protrusion of the second panel 120 may correspond in shape to the groove of the first panel 110. For example, the protrusion and the groove may be rectangular. The panel may include a handle for rotating the handle around the hinge 130. The second panel 120 may be lifted with respect to the first panel 110 using the handle. The second panel 120 may rotate about the hinge 130 by manipulating the position of the handle.

The overlapping portion may be formed between the groove of the first panel 110 and the protrusion of the second panel 120. The overlapping portion may be formed when the first panel 110 and the second panel 120 are in a horizontal configuration. The overlapping portion may separate when the second panel 120 is folded away from the first panel 110. For example, the hinge 130 may be configured to separate the groove of the first panel 110 from the protrusion at the second panel 120 by rotating the hinge 130. In some embodiments, the hinge 130 may be coupled at the lower edge of the first panel 110 and the hinge 130 may be coupled to a base of the protrusion on the bottom surface of the second panel 120.

Figure 3:
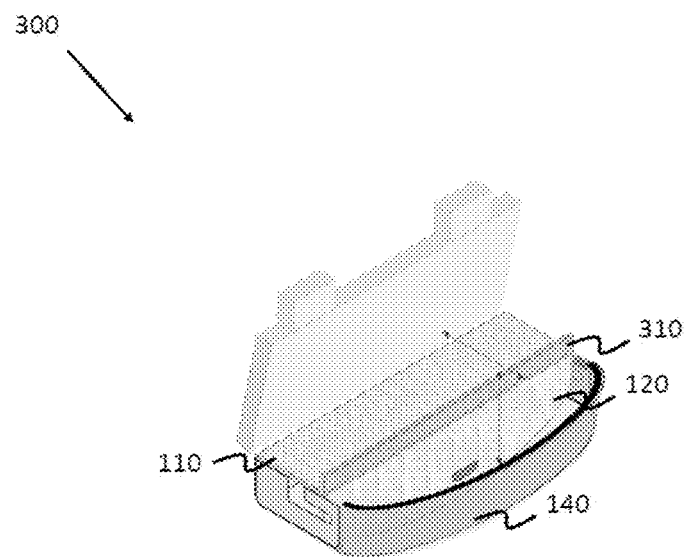
FIG. 3 depicts an example of a diagram representative of a cargo storage assembly in a configuration with a retaining wall and an exposed underfloor compartment.

FIG. 3 depicts an example of a diagram representative of a cargo storage assembly in a configuration with a retaining wall 310 and an exposed underfloor compartment 140. The underfloor compartment 140 of the cargo storage assembly may prevent items from falling out of the trunk when the trunk door is opened. The underfloor compartment 140 may maintain items separated from the remaining portion of the trunk. The underfloor compartment 140 may be at the most rearward portion of the cargo storage assembly and may be used to conceal items underneath the main vehicle floor.

The cargo storage assembly may be configured to expose an underfloor compartment 140. The underfloor compartment 140 may be located underneath the second panel 120 or the rear panel. Additionally, and/or alternatively, the underfloor compartment 140 may be located underneath the first panel 110 or the forward panel. In some embodiments, folding the first panel 110 may expose the underfloor compartment 140 under the first panel 110 and folding the second panel 120 may expose the underfloor panel underneath the second panel 120.

The underfloor compartment 140 may include a notch 145. The notch 145 may be configured to secure the second panel 120 in the vertical orientation. Additionally, the notch 145 may be located near or at the middle of the underfloor compartment 140. The notch 145 may be a depression in the underfloor compartment 140. The width of the notch 145 may be approximately the depth of the first panel 110 or the second panel 120. The depth of the notch 145 may secure the first panel 110 or the second panel 120 in a vertical orientation.

The underfloor compartment 140 may be configured to be exposed by rotating the hinge 130. The underfloor compartment 140 may be exposed by rotating the second panel 120 from a horizontal configuration to a vertical orientation using the hinge 130. For example, a user may rotate the hinge 130 such that the second panel 120 is approximately perpendicular to the first panel 110. The user may rotate the second panel 120 from the first panel 110 via the hinge 130. Once the second panel 120 is in a vertical orientation, the user may insert the second panel 120 into the notch 145.

In some embodiments, a bracket may be configured to secure the second panel 120 in a vertical orientation. The bracket may be located at a sidewall of the underfloor compartment 140. The bracket may include a rubber stop to prevent the second panel 120 from sliding forward or backward across the underfloor compartment 140. Additionally, and/or alternatively, the bracket may include two blocks to immobilize the second panel 120 from moving in a horizontal direction. In some embodiments, the second panel 120 may be guided beyond the bracket to a vertical orientation with respect to the first panel 110.

Folding the second panel 120 relative to the first panel 110 may form a retaining wall 310. The retaining wall 310 may be formed when the second panel 120 is in the vertical orientation. In particular, the retaining wall 310 may be formed by the protrusion of the second panel 120. The base of the retaining wall 310 may be formed by the hinge 130. The top of the retaining wall 310 may be formed by the edge of the second panel 120. The retaining wall 310 may create a separation between the main cargo floor of the vehicle and the underfloor compartment 140 to prevent an object from falling into the underfloor compartment 140.

Figure 4A:
FIG. 4A depicts an example of a drawing illustrating of a cargo storage assembly carrying groceries in a configuration with a main cargo floor.

FIG. 4A depicts an example of a drawing illustrating of a cargo storage assembly carrying groceries in a configuration with a main cargo floor. The first panel 110 and the second panel 120 may form a cargo load floor. The cargo load floor may be in a horizontal configuration and may enclose the underfloor compartment 140.

In this configuration, the cargo storage assembly may include a main cargo floor. The main cargo floor may not be suitable for carrying small items as some items may roll around while driving or fall out of the trunk when the trunk door is opened.

Figure 4B:
FIG. 4B depicts an example of a drawing illustrating a cargo storage assembly carrying groceries with a retaining wall and an exposed underfloor compartment.

FIG. 4B depicts an example of a drawing illustrating a cargo storage assembly carrying groceries with a retaining wall 310 and an exposed underfloor compartment 140. The underfloor compartment 140 of the cargo storage assembly may prevent items from falling out of the trunk when the trunk door is opened. The underfloor compartment 140 may keep items separated from the remaining portion of the trunk. The underfloor compartment 140 may be at the most rearward portion of the cargo storage assembly. The underfloor compartment 140 may be used to conceal items underneath the main vehicle floor.

A retaining wall 310 may extend between the main floor of the vehicle and the underfloor compartment 140. This retaining wall 310 may prevent an object from falling into the underfloor compartment 140. The retaining wall 310 may provide additional support to taller items that are situated the underfloor compartment 140 to prevent tipping. The retaining wall 310 may create separation between the main floor of the vehicle and the underfloor compartment 140.

Figure 5A:
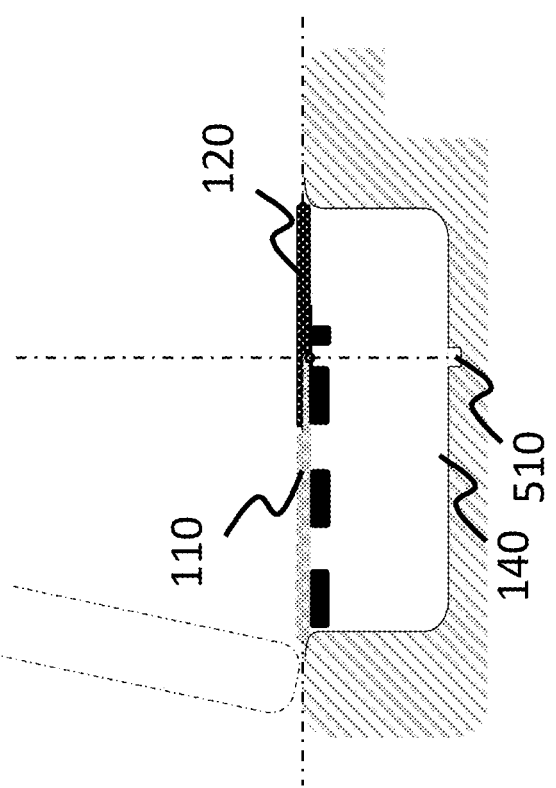
FIG. 5A depicts an example of a side view of a diagram representative of cargo storage assembly in a horizontal configuration.

FIG. 5A depicts an example of a side view of a diagram representative of cargo storage assembly in a horizontal configuration. The side view may show the overlapping portion between the first panel 110 and the second panel 120. The side view may also show the protrusion of the second panel 120 and the groove of the second panel 120. The protrusion of the second panel 120 may overlap the groove of the second panel 120.

The cargo storage assembly may transform from a horizontal configuration to a configuration exposing the underfloor compartment 140. In the horizontal configuration, the first panel 110 and the second panel 120 may form a partial overlap. The partial overlap may be formed by portions of the first panel 110 and the second panel 120. A hinge 130 may be coupled to the first panel 110 and the second panel 120. The hinge 130 may be configured to rotate the second panel 120 to a vertical orientation with respect to the first panel 110 to expose an underfloor compartment 140. In some embodiments, the hinge 130 may be configured to rotate the first panel 110 to a vertical orientation with respect to the second panel 120 to expose an underfloor compartment 140. The overlapping portion of the first panel 110 and the second panel 120 may maximize the space in the trunk by increasing the likelihood that all portions of the trunk are utilized. That is, the overlapping portion of the panel may prevent dead space unable to carry cargo in the back of the vehicle.

The first panel 110 and the second panel 120 may form a main cargo floor. The main cargo floor may be flat when the first panel 110 and the second panel 120 are in a horizontal configuration. The main cargo floor may cover an underfloor compartment 140. The main cargo floor may fold to expose the underfloor compartment 140 by pivoting one of the panels via a hinge 130. The hinge 130 may couple the first panel 110 and the second panel 120. The hinge 130 may be located at the midway point of the main cargo floor. The hinge 130 may be at the overlapping portion of the first panel 110 and the second panel 120. The hinge 130 may be at the edge of the overlapping portion. For example, the hinge 130 may be at the edge of the first panel 110. The first panel 110 and the second panel 120 may be configured to rotate with respect to each other at the edge of the first panel 110. The hinge 130 may be located at the base of a protrusion of the second panel 120.

Figure 5B:
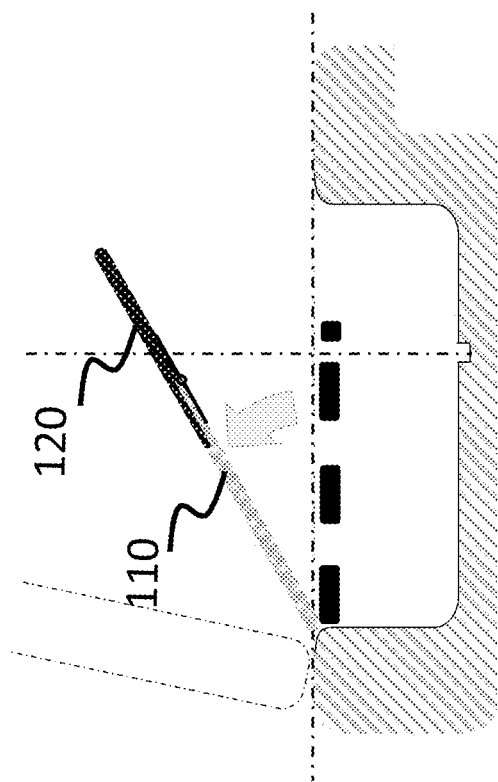
FIG. 5B depicts an example of a side view of a diagram representative of cargo storage assembly in a raised configuration.

FIG. 5B depicts an example of a side view of a diagram representative of cargo storage assembly in a raised configuration. The cargo storage assembly may transform from a horizontal configuration to a configuration exposing the underfloor compartment 140.

To transform the cargo storage assembly to expose the underfloor compartment 140, the user may lift the handle to elevate the second panel 120 with respect to the first panel 110. The partial overlap of the groove of the first panel 110 and the protrusion of the second panel 120 may be maintained as the second panel 120 is lifted. The groove of the first panel 110 and the protrusion of the second panel 120 may be at an angle with respect to the cargo load floor in the horizontal position. As the second panel 120 is lifted, the main cargo floor may be elevated at an angle with respect to the front edge of the first panel 110. Additionally, and/or alternatively, the main cargo floor may pivot around a hinge 130 at the front edge of the first panel 110.

Figure 5C:
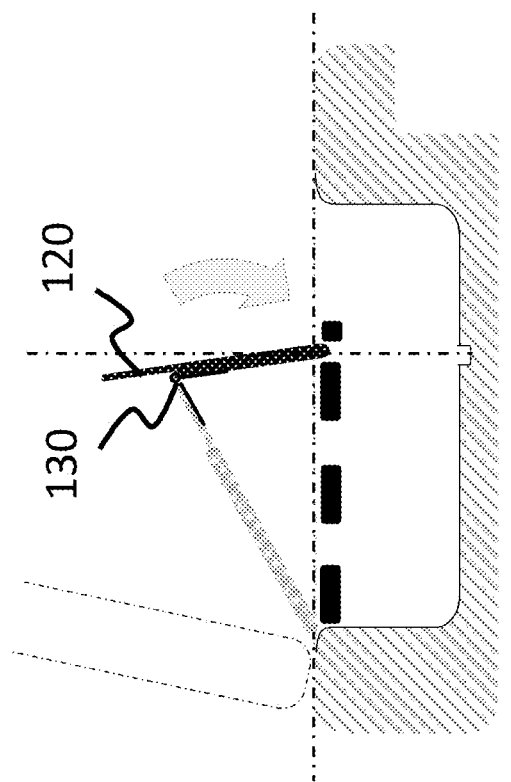
FIG. 5C depicts an example of a side view of a diagram representative of cargo storage assembly in a rotated configuration.

FIG. 5C depicts an example of a side view of a diagram representative of cargo storage assembly in a rotated configuration. The cargo storage assembly may transform from a horizontal configuration to a configuration exposing the underfloor compartment 140.

To transform the cargo storage assembly to expose the underfloor compartment 140, the user may rotate a hinge 130 coupled to the first panel 110 and the second panel 120. The hinge 130 may be coupled at the groove of the first panel 110 and coupled to the bottom surface of the second panel 120. The hinge 130 may be configured to rotate the second panel 120 to a vertical orientation with respect to the first panel 110 to expose an underfloor compartment 140. Rotating the hinge 130 may separate the groove of the first panel 110 from the protrusion at the second panel 120.

In some embodiments, the user may guide the second panel 120 beyond a bracket located in the underfloor compartment 140 to the vertical orientation with respect to the first panel 110. The user may rotate the panel to an approximately vertical angle about the hinge 130. The bracket may prevent the second panel 120 from sliding forward or backward across the floor of the underfloor compartment 140.

Figure 5D:
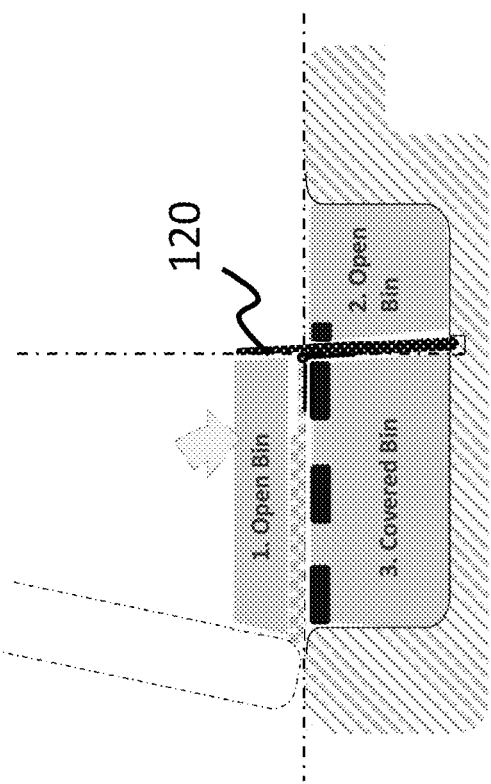
FIG. 5D depicts an example of a side view of a diagram representative of cargo storage assembly with the second panel in a vertical configuration.

FIG. 5D depicts an example of a side view of a diagram representative of cargo storage assembly with the second panel 120 in a vertical configuration. The cargo storage assembly may transform from a horizontal configuration to a vertical configuration exposing the underfloor compartment 140.

To transform the cargo storage assembly to expose the underfloor compartment 140, the second panel 120 may be inserted into a notch 145 in the underfloor compartment 140. The notch 145 may be configured to secure the second panel 120 in the vertical orientation. A retaining wall 310 may be formed by inserting the second panel 120 into the notch 145. The retaining wall 310 may divide the first panel 110 and the underfloor compartment 140.

Figure 6A:
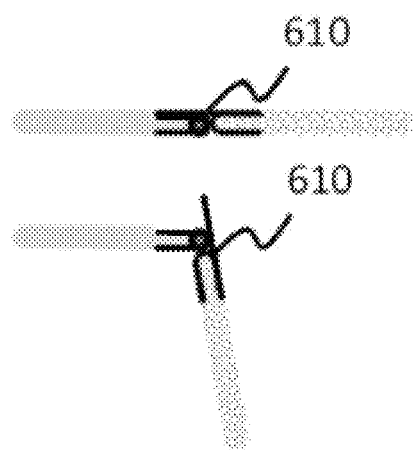
FIG. 6A depicts an example of a side view of a diagram of a piano hinge as another example of a hinge for the cargo storage assembly.

FIG. 6A depicts an example of a side view of a diagram of a piano hinge 610 as an example of a hinge used for the cargo storage assembly. A piano hinge 610 may include members configured to extend around the groove of the first panel 110 and the protrusion of the second panel 120. The members may extend around the groove and protrusion to secure the two panels together. The piano hinge 610 may include a top layer configured to extend across the top of the overlapping portion of the first panel 110 and the second panel 120. The top layer may reinforce the strength of the two panels at the overlapping portion. The top layer may extend the height of the retaining wall 310. The piano hinge 610 may be configured to bend at different angles as the second panel 120 is manipulated around the first panel 110.

Figure 6B:
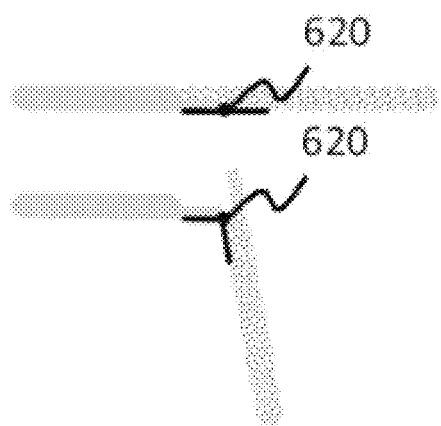
FIG. 6B depicts an example of a side view of a diagram of a U-channel hinge as another example of a hinge for the cargo storage assembly.

FIG. 6B depicts an example of a side view of a diagram of a U-channel hinge 620 as another example of a hinge for the cargo storage assembly. The U-channel hinge 620 may include members to extend under the groove of the first panel 110 and the protrusion of the second panel 120. The members may reinforce the underside of the groove and the protrusion to secure the two panels together. The U-channel may be configured to bend at different angles as the second panel 120 is manipulated around the first panel 110.

Figure 6C:
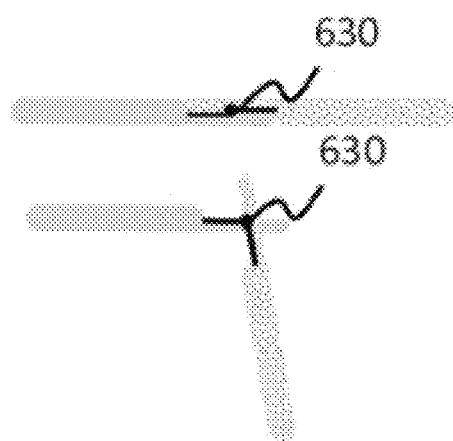
FIG. 6C depicts an example of a side view of a diagram of a living hinge as another example of a hinge for the cargo storage assembly.

FIG. 6C depicts an example of a side view of a diagram of a living hinge 630 as another example of a hinge for the cargo storage assembly. The living hinge 630 may include members configured to extend over the top surface of the groove of the first panel 110 and the bottom surface of the protrusion of the second panel 120. The members may extend around the groove and protrusion to secure the two panels together. The living hinge 630 may be inserted between the top surface of the groove and the bottom surface of the protrusion to reinforce the overlapping region of the first panel 110 and the second panel 120. The living hinge 630 may be configured to bend at different angles as the second panel 120 is manipulated around the first panel 110.

Figure 6D:
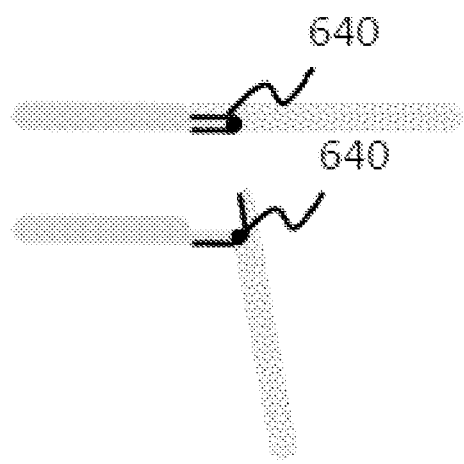
FIG. 6D depicts an example of a side view of a diagram of an interlaced hinge as another example of a hinge for the cargo storage assembly.

FIG. 6D depicts an example of a side view of a diagram of an interlaced hinge 640 as another example of a hinge for the cargo storage assembly. The interlaced hinge 640 may include members configured to extend over the bottom surface of the groove of the first panel 110 and the bottom surface of the protrusion of the second panel 120. The members may extend around the groove and protrusion to secure the two panels together. The interlaced hinge 640 may be inserted between the bottom surface of the groove and the bottom surface of the protrusion to reinforce the overlapping region of the first panel 110 and the second panel 120. The interlaced hinge 640 may be configured to bend at different angles as the second panel 120 is manipulated around the first panel 110.

FIG. 7A depicts an example of a side view of a diagram of multiple panels with different hinge types. In some embodiments, multiple panels may be connected together. For example, the second panel 120 may be coupled to a first panel 110 and a third panel 122. The interface between the first panel 110 and the second panel 120 may include a U-channel hinge 620 and the interface between the second panel 120 and third panel 122 may include a living hinge 630. In another example, the interface between the first panel 110 and the second panel 120 may include a U-channel hinge 620 and the interface between the second panel 120 and third panel 122 may include a living hinge 630.

FIG. 7B depicts an example of a side view of another diagram of multiple panels with different hinge types. In some embodiments, multiple panels may be connected together with different hinges. For example, the second panel 120 may be coupled to a first panel 110 and a third panel 122. The interface between the first panel 110 and the second panel 120 may include a U-channel hinge 620 and the interface between the second panel 120 and third panel 122 may include a U-channel hinge 620. In another example, the interface between the first panel 110 and the second panel 120 may include a U-channel hinge 620 and the interface between the second panel 120 and third panel 122 may include a piano hinge 610.

Figure 8:
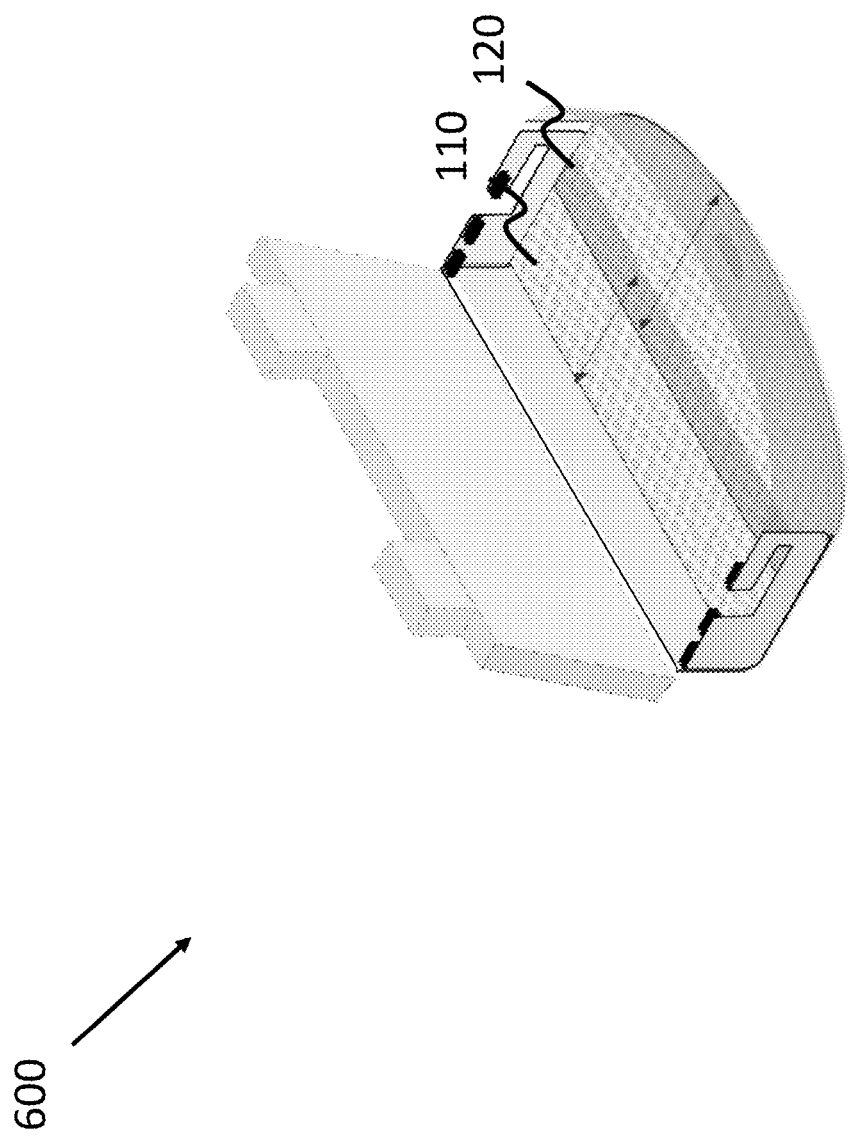
FIG. 8 depicts an example of an assembled view of a diagram representative of a cargo storage assembly configured to drop down to the underfloor compartment.

FIG. 8 depicts an example of an assembled view of a diagram representative of a cargo storage assembly configured to drop down to the underfloor compartment 140. The cargo load assembly may need to maximize the space available for storing large items. The cargo load assembly may be configured to maximize the space in the trunk of the vehicle.

The cargo load assembly may be configured to fit inside the underfloor compartment 140. The first panel 110 and the second panel 120 may be configured to fold down in the underfloor compartment 140 in a horizontal configuration.

The first panel 110 and the second panel 120 may slide together or partially slide together to place the panels in the underfloor compartment 140. The first panel 110 and the second panel 120 may maintain the overlapping portion while the first panel 110 and the second panel 120 are in the underfloor bin. The cargo load assembly may fit inside the underfloor compartment 140 to maximize space in the trunk of the vehicle. In some embodiments, the cargo load assembly may be removable. The first panel 110, the second panel 120, and the hinge 130 may be removed from the trunk of the vehicle to maximize the space in the underfloor compartment 140.

Figure 9:
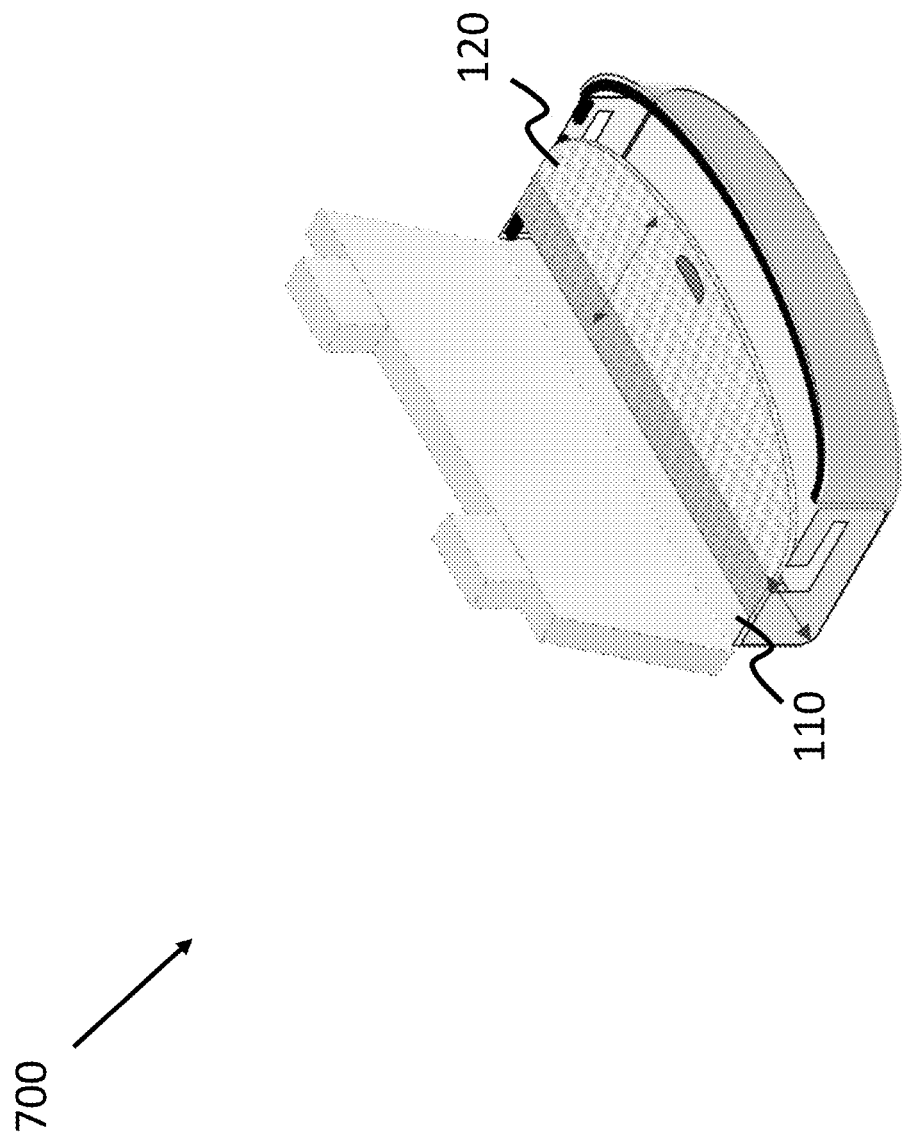
FIG. 9 depicts an example of an assembled view of a diagram representative of a cargo storage assembly configured to partially expose the underfloor compartment.

FIG. 9 depicts an example of an assembled view of a diagram representative of a cargo storage assembly configured to partially expose the underfloor compartment 140. The cargo load assembly may need to partially expose the underfloor compartment 140. The cargo load assembly may be placed in a partially opened configuration to quickly access or insert an item from the underfloor compartment 140.

The cargo load assembly may be configured to partially expose the underfloor compartment 140. To partially expose the underfloor compartment 140, the second panel 120 may be shifted forward across the first panel 110. Additionally, and/or alternatively, the second panel 120 may be rotated about the hinge 130. For example, the second panel 120 may be lifted to an elevated position above the first panel 110. The overlapping portion of the first panel 110 and the second panel 120 may fold over itself to partially expose the underfloor compartment 140. In some embodiments, the overlapping portion between the first panel 110 and the second panel 120 may be increased as a bottom surface of the second panel 120 folds over or slides over the first panel 110.

Figure 10:
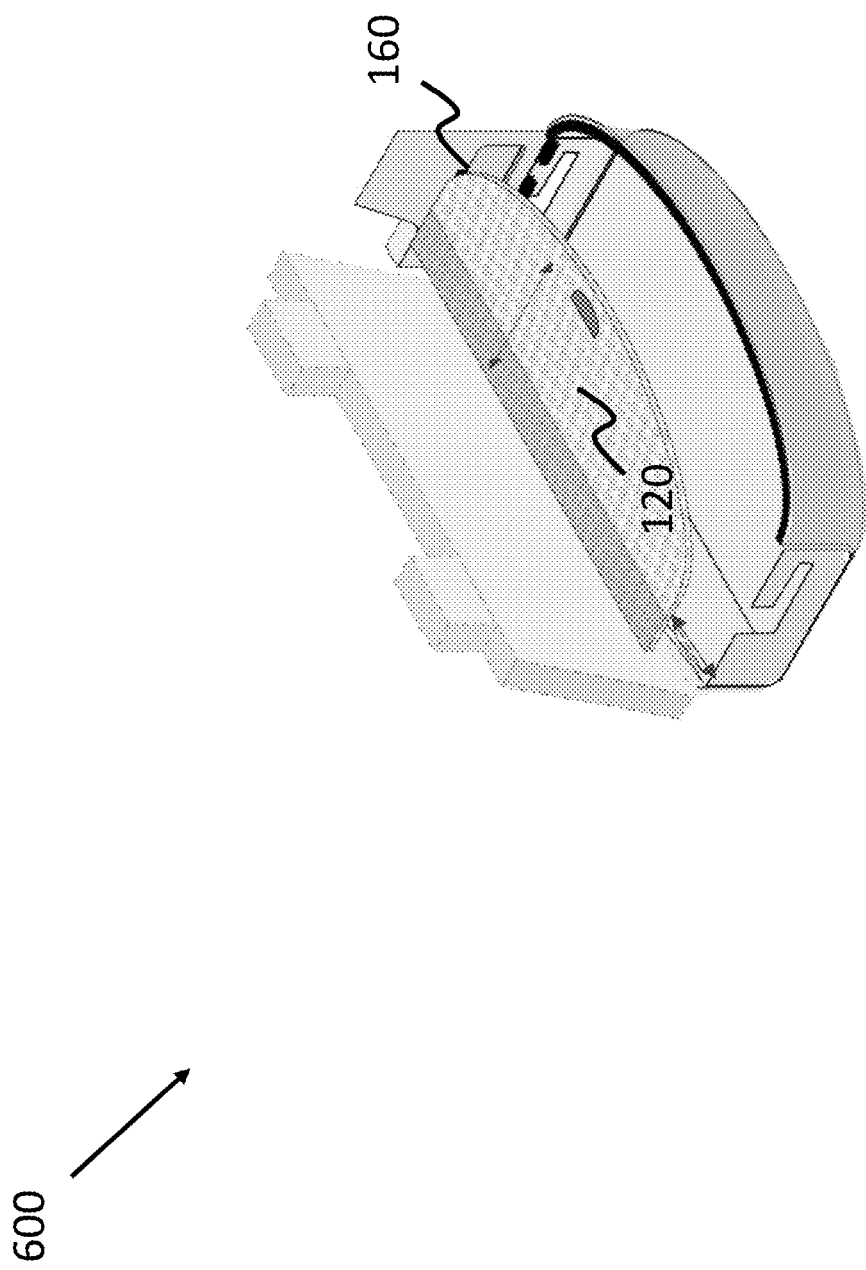
FIG. 10 depicts an example of an assembled view of a diagram representative of a covered cargo assembly in an elevated configuration.

FIG. 10 depicts an example of an assembled view of a diagram representative of a covered cargo assembly in an elevated configuration. The first panel 110 and the second panel 120 may be placed into different configurations by a hinge 130. The hinge 130 may be used to form a cargo cover configuration. Unlike other cargo cover assemblies, the first panel 110 and the second panel 120 may transition from a main cargo floor to a cargo cover. The cargo cover structure may elevate the cargo storage assembly to a higher position within the trunk. This elevated position may obstruct the view into the vehicle. For example, the cargo storage assembly may be elevated near the window to block persons from viewing the items in the trunk.

The covered cargo assembly may include a first panel 110 and a second panel 120. The first panel 110 and the second panel 120 may form a partial overlap. The partial overlap may be formed by portions of the first panel 110 and the second panel 120. A hinge 130 may be coupled to the first panel 110 and the second panel 120. The hinge 130 may be configured to rotate the second panel 120 to form a covered cargo area. The overlapping portions of the first panel 110 and the second panel 120 may maximize the covered area in the trunk by increasing the likelihood that all portions of the trunk are covered. That is, the overlapping portions may extend the second panel 120 close to window to obstruct the view into the trunk.

As described above, the first panel 110 and the second panel 120 may form a main cargo floor. The main cargo floor may be flat when the first panel 110 and the second panel 120 are in a horizontal configuration. The second panel 120 of the main cargo floor may be elevated and rotated via a hinge 130 to form the covered cargo area. The hinge 130 may couple the first panel 110 and the second panel 120. The hinge 130 may be located at the midway point of the main cargo floor. The hinge 130 may be at the overlapping portion of the first panel 110 and the second panel 120. The hinge 130 may be at the edge of the overlapping portion. For example, the hinge 130 may be at the edge of the first panel 110. The first panel 110 and the second panel 120 may be configured to rotate with respect to each other at the edge of the first panel 110. The hinge 130 may be located at the base of a protrusion of the second panel 120.

The first panel 110 may have a groove. The groove may be proximate to the second panel 120 that extends along a top surface of the first panel 110. The first panel 110 may include a top surface with a groove for the overlapping portion on the top surface. The groove may extend approximately half the depth of the first panel 110. The groove may extend along a lower edge of the first panel 110. The lower edge may be proximate to the second panel 120. In some embodiments, the groove may be a cutout. The overlapping portion of the second panel 120 may be configured to fit in the cutout at the first panel 110.

As described above, the second panel 120 may have a protrusion. The protrusion may be proximate to the first panel 110 that extends along a bottom surface of the second panel 120. The second panel 120 may include a bottom surface with a protrusion for the overlapping portion of the bottom surface. The protrusion may extend approximately half the height or depth of the second panel 120. In some embodiments, the protrusion may be a cutout. The overlapping portion of the second panel 120 may be configured to fit in the cutout at the second panel 120. The protrusion of the second panel 120 may correspond in size to the groove of the first panel 110. The panel may include a handle for rotating the handle around the hinge 130. The second panel 120 may be lifted with respect to the first panel 110 using the handle. The second panel 120 may rotate about the hinge 130 by manipulating the position of the handle.

The overlapping portion may be formed between the groove of the first panel 110 and the protrusion of the second panel 120. The overlapping portion may be formed when the first panel 110 and the second panel 120 are in a horizontal configuration. The overlapping portion may separate when the second panel 120 is folded away from the first panel 110. For example, the hinge 130 may be configured to separate the groove of the first panel 110 from the protrusion at the second panel 120 by rotating the hinge 130. In some embodiments, the hinge 130 may be coupled at the lower edge of the first panel 110 and the hinge 130 may be coupled to a base of the protrusion on the bottom surface of the second panel 120.

The cargo storage assembly may be configured to form a covered cargo area. The covered cargo assembly may include the first panel 110 and the second panel 120. The first panel 110 and the second panel 120 may cover the underlying trunk area. The second panel 120 may be elevated higher than the first panel 110 and placed closer to a rear window than the first panel 110. A bracket may be configured to support the second panel 120 in an elevated configuration. The second panel 120 may be configured to elevate relative to the first panel 110. The overlap of the first panel 110 and second panel 120 may be maintained while pivoting the first panel 110 and the second panel 120 at an angle past a bracket to form the covered cargo area. The second panel 120 may be configured to rotate about the hinge 130 in the elevated configuration to be supported by the bracket to form the covered cargo area.

The cargo storage assembly may be formed by rotating the hinge 130. The hinge 130 may rotate the second panel 120 from a horizontal configuration when the second panel 120 is elevated above the first panel 110. The hinge 130 may rotate the second panel 120 to rest on a deployable bracket 160 located on the side of the trunk. More specifically, the second panel 120 may be configured to rotate down such that the bottom surface of the second panel 120 rests on the bracket. For example, a user may rotate the hinge 130 such that the second panel 120 is approximately parallel to the deployable bracket 160. Rotating the second panel 120 may separate the groove of the first panel 110 from the protrusion of the second panel 120. Once the second panel 120 is elevated and rotated, the user may deploy the bracket to support the second panel 120. The bracket may be configured to be deployed to form the covered cargo area. A side trim panel may be configured to house and deploy the bracket to maintain the second panel 120 in the elevated configuration.

Figure 11A:
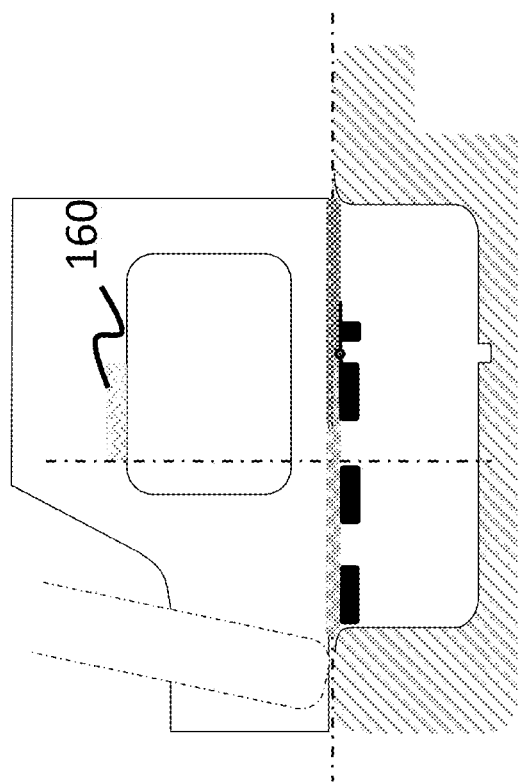
FIG. 11A depicts an example of a side view of a diagram representative of a covered cargo assembly in a horizontal configuration.

FIG. 11A depicts an example of a side view of a diagram representative of a covered cargo assembly in a horizontal configuration. The side view shows the overlapping portion between the first panel 110 and the second panel 120. The side view shows the protrusion of the second panel 120 and the groove of the second panel 120. The protrusion of the second panel 120 may overlap the groove of the second panel 120. The cargo load floor may transition to form a covered cargo area.

The cargo storage assembly may transform from a horizontal configuration to a configuration exposing the underfloor compartment 140. In the horizontal configuration, the first panel 110 and the second panel 120 may form an overlap. The overlap may be formed by portions of the first panel 110 and the second panel 120. The second panel 120 may be elevated with respect to the first panel 110. A hinge 130 may be coupled to the first panel 110 and the second panel 120. The hinge 130 may be configured to rotate the second panel 120 to form a covered cargo area. The covered cargo area may obstruct the view of the contents on the main cargo floor through the window of the vehicle.

The first panel 110 and the second panel 120 may form a main cargo floor. The main cargo floor may be flat when the first panel 110 and the second panel 120 are in a horizontal configuration. The main cargo floor may form a covered cargo area. The main cargo floor may form the covered cargo area by elevating the second panel 120 and rotating the second panel 120 to rest on the deployable bracket 160.

As described above, the hinge 130 may couple the first panel 110 and the second panel 120. The hinge 130 may be at the midway point of the main cargo floor. The hinge 130 may be at the overlapping portion of the first panel 110 and the second panel 120. The hinge 130 may be at the edge of the overlapping portion. For example, the hinge 130 may be at the edge of the first panel 110. The first panel 110 and the second panel 120 may be configured to rotate with respect to each other at the edge of the first panel 110. The hinge 130 may be located at the base of a protrusion of the second panel 120.

Figure 11B:
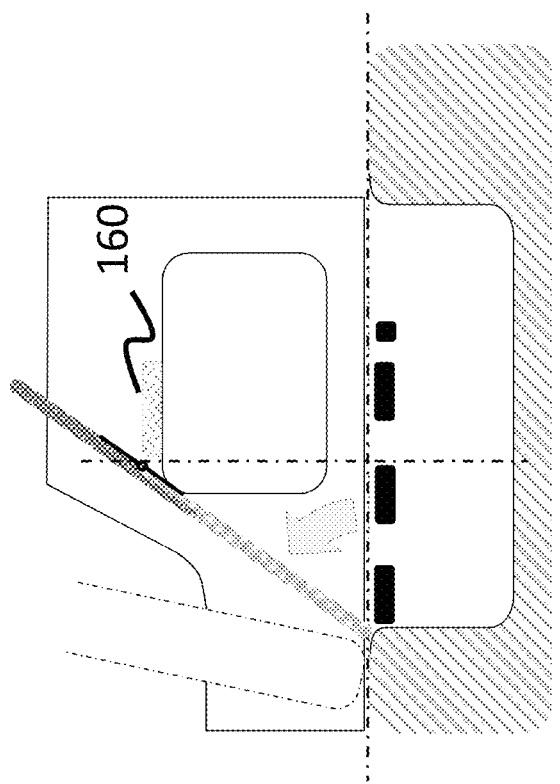
FIG. 11B depicts an example of a side view of a diagram representative of a covered cargo assembly in an elevated configuration.

FIG. 11B depicts an example of a side view of a diagram representative of a covered cargo assembly in an elevated configuration. The cargo storage assembly may transform from a horizontal configuration to form the covered cargo area.

To transform the cargo storage assembly to form the covered cargo area, the user may lift the handle to elevate the second panel 120 with respect to the first panel 110. The overlap of the groove of the first panel 110 and the protrusion of the second panel 120 may be maintained as the second panel 120 is lifted. The groove of the first panel 110 and the protrusion of the second panel 120 may be at an angle with respect to the cargo load floor in the horizontal position. As the second panel 120 is lifted, the main cargo floor may be elevated at an angle with respect to the front edge of the first panel 110. Additionally, and/or alternatively, the main cargo floor may pivot around a hinge 130 at the front edge of the first panel 110. The user may elevate the second panel 120 at an angle past the deployable bracket 160.

Figure 11C:
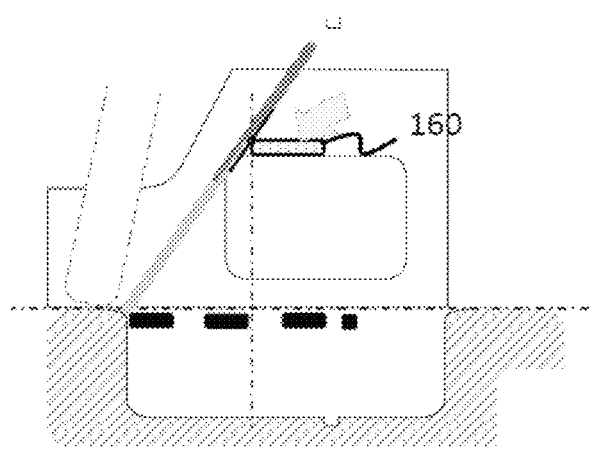
FIG. 11C depicts an example of a side view of a diagram representative of a covered cargo assembly with the bracket deployed.

FIG. 11C depicts an example of a side view of a diagram representative of a covered cargo assembly with the bracket deployed. The cargo storage assembly may transform from a horizontal configuration to form the covered cargo area.

This cargo storage assembly may include a side trim panel with a deployable bracket 160 configured to support the second panel 120 in an elevated configuration to form the covered cargo area. To transform the cargo storage assembly to form the covered cargo area, the user may deploy the bracket located at the side trim panel. That is, the user may pull the bracket from the side trim panel. Additionally, and/or alternatively, the user may slide, twist or rotate the bracket from the side trim panel.

Figure 11D:
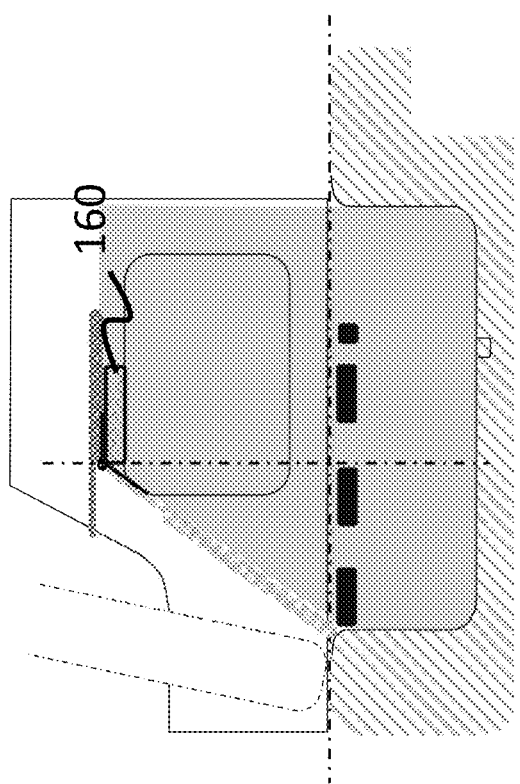
FIG. 11D depicts an example of a side view of a diagram representative of a covered cargo assembly with the second panel in an elevated configuration supported by the bracket.

FIG. 11D depicts an example of a side view of a diagram representative of a covered cargo assembly with the second panel 120 in an elevated configuration supported by the bracket. The cargo storage assembly may transform from a horizontal configuration to form the covered cargo area.

To transform the cargo storage assembly to form the covered cargo area, the user may rotate the second panel 120 down such that the bottom surface of the second panel 120 rests on the bracket. The hinge 130 may be coupled at the groove of the first panel 110 and coupled to the bottom surface of the second panel 120. The hinge 130 may be configured to rotate the second panel 120 to a vertical orientation with respect to the first panel 110 to expose an underfloor compartment 140. Rotating the hinge 130 may separate the groove of the first panel 110 from the protrusion at the second panel 120.

The technical advantages presented herein may result in a cargo storage assembly that is simple, easy-to-use, and durable. The cargo storage assembly may provide a flexible cargo utilization that can meet various cargo needs. The retaining wall may create a fence or barrier to prevent cargo rolling from around different portions of the trunk. The cargo storage assembly may include an underfloor bin that prevents items from rolling out the back of the vehicle. The underfloor compartment may conceal items underneath the main storage floor of the floor. Additionally, the cargo storage assembly may be configured to modify its structure to a cargo cover. The cargo cover configuration may obstruct persons from seeing the cargo in the trunk. The cargo cover configuration may obstruct the view of larger items.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system for modifying a storage configuration in a vehicle, the system comprising:

a first panel and a second panel, the first panel having a groove proximate to the second panel that extends along a top surface of the first panel, the second panel having a protrusion proximate to the first panel that extends along a bottom surface of the second panel, the protrusion of the second panel corresponding in size to the groove of the first panel;

an overlap formed between the groove and the protrusion with the first panel and the second panel in a horizontal configuration;

a hinge coupled to the groove of the first panel and coupled to the bottom surface of the second panel, the hinge configured to rotate the second panel to a vertical orientation with respect to the first panel to expose an underfloor compartment;

a bracket for supporting the second panel in an elevated configuration;

wherein the second panel is configured to elevate relative to the first panel;

wherein the second panel is configured to rotate about the hinge in the elevated configuration to be supported by the bracket to form a covered cargo area; and a side trim panel configured to house and deploy the bracket to maintain the second panel in the elevated configuration, wherein the bracket is configured to be deployed to form the covered cargo area.

2. The system of claim 1, further comprising:
a notch in the underfloor compartment for securing the second panel in the vertical orientation,
wherein the underfloor compartment is configured to be exposed by:
  rotating the hinge such that the second panel is approximately perpendicular to the first panel; and
  inserting the second panel into the notch.

3. The system of claim 2, wherein the hinge is configured to separate the groove of the first panel from the protrusion at the second panel by rotating the hinge.

4. The system of claim 2, further comprising:
a side bracket in the underfloor compartment, the side bracket configured to maintain the second panel in the vertical orientation, and wherein the second panel is guided beyond the side bracket to the vertical orientation with respect to the first panel to expose the underfloor compartment.

5. The system of claim 2, further comprising:
a retaining wall between the first panel and the underfloor compartment, the retaining wall formed by the protrusion of the second panel upon inserting the second panel into the notch.

6. The system of claim 2, further comprising:
a cargo load floor,
wherein the overlap of the groove of the first panel and the protrusion of the second panel is maintained while pivoting the first panel and the second panel at an angle with respect to the cargo load floor to expose the underfloor compartment.

7. The system of claim 1, further comprising:
a cargo load floor formed by the first panel and the second panel in the horizontal configuration, the cargo load floor formed by the first panel and the second panel in the horizontal configuration enclosing the underfloor compartment.

8. The system of claim 1, wherein the groove extends along a lower edge of the first panel, the lower edge being proximate to the second panel.

9. The system of claim 8, wherein the hinge is coupled at the lower edge of the first panel and the hinge is coupled to a base of the protrusion on the bottom surface of the second panel.

10. The system of claim 1, wherein the first panel and the second panel are disposed between a vehicle seat and a rear vehicle door and wherein the hinge is at least one of a piano hinge type, a U-channel hinge type, a living hinge type, and an interlaced finger type.

11. A system for modifying a storage configuration in a vehicle, the system comprising:
a first panel and a second panel, the first panel having a groove proximate to the second panel that extends along a top surface of the first panel, the second panel having a protrusion proximate to the first panel that extends along a bottom surface of the second panel, the protrusion of the second panel corresponding in size to the groove of the first panel;

an overlap formed between the groove and the protrusion with the first panel and the second panel in a horizontal configuration;

a hinge coupled to the groove of the first panel and coupled to the bottom surface of the second panel, the hinge configured to rotate the second panel to form a covered cargo area;

a bracket for supporting the second panel in an elevated configuration;

wherein the second panel is configured to elevate relative to the first panel;

wherein the second panel is configured to rotate about the hinge in the elevated configuration to be supported by the bracket to form the covered cargo area; and a side trim panel configured to house and deploy the bracket to maintain the second panel in the elevated configuration, wherein the bracket is configured to be deployed to form the covered cargo area.

12. The system of claim 11, wherein the overlap of the first panel and the second panel is maintained while pivoting the first panel and the second panel at an angle past the bracket to form the covered cargo area.

13. The system of claim 11, wherein the second panel is configured to rotate down such that the bottom surface of the second panel rests on the bracket to form the covered cargo area.

14. The system of claim 13, wherein the second panel is configured to rotate down to separate the groove of the first panel from the protrusion at the second panel.

15. The system of claim 11, wherein the first panel and the second panel in the horizontal configuration form a cargo load floor of the vehicle.

16. The system of claim 11, wherein the groove extends along a lower edge of the first panel, the lower edge being proximate to the second panel.

17. The system of claim 16, wherein the hinge is coupled at the lower edge of the first panel and the hinge is coupled to a base of the protrusion on the bottom surface of the second panel.

18. The system of claim 11, wherein the first panel and the second panel are disposed between a vehicle seat and a rear vehicle door and wherein the hinge is at least one of a piano hinge type, a U-channel hinge type, a living hinge type, and an interlaced finger type.

* * * * *